(12) United States Patent
Yamazaki et al.

(10) Patent No.: US 11,397,880 B2
(45) Date of Patent: Jul. 26, 2022

(54) CONVEYANCE DEVICE, IMAGE READING DEVICE, AND IMAGE FORMING APPARATUS

(71) Applicants: Kimiharu Yamazaki, Kanagawa (JP); Hideyo Makino, Tokyo (JP); Susumu Mikajiri, Tokyo (JP); Satoshi Nakayama, Kanagawa (JP); Kohta Aoyagi, Kanagawa (JP); Hiroki Yamamura, Tokyo (JP)

(72) Inventors: Kimiharu Yamazaki, Kanagawa (JP); Hideyo Makino, Tokyo (JP); Susumu Mikajiri, Tokyo (JP); Satoshi Nakayama, Kanagawa (JP); Kohta Aoyagi, Kanagawa (JP); Hiroki Yamamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 43 days.

(21) Appl. No.: 17/103,586

(22) Filed: Nov. 24, 2020

(65) Prior Publication Data
US 2021/0166096 A1 Jun. 3, 2021

(30) Foreign Application Priority Data

Nov. 29, 2019 (JP) .............................. JP2019-217111
Nov. 6, 2020 (JP) .............................. JP2020-185932

(51) Int. Cl.
*G06K 15/16* (2006.01)
*G03G 15/00* (2006.01)
(Continued)

(52) U.S. Cl.
CPC ............. *G06K 15/16* (2013.01); *B65H 5/062* (2013.01); *G03G 15/6529* (2013.01);
(Continued)

(58) Field of Classification Search
CPC .......... B65H 2404/14; B65H 2404/143; B65H 2511/11; B65H 2511/14; B65H 2511/512;
(Continued)

(56) References Cited

U.S. PATENT DOCUMENTS

2008/0240754 A1* 10/2008 Kobayashi ......... G03G 15/0194
399/46
2013/0286442 A1 10/2013 Nishida
(Continued)

FOREIGN PATENT DOCUMENTS

JP 2007-004137 1/2007
JP 2008-271473 11/2008
(Continued)

*Primary Examiner* — Negussie Worku
(74) *Attorney, Agent, or Firm* — Duft & Bornsen, PC

(57) ABSTRACT

A conveyance device includes a conveyance roller pair to convey a recording medium to an image reading position of an image reading unit. The conveyance roller pair includes a drive roller and a driven roller. The driven roller contacts the drive roller and rotates following the drive roller. The drive roller has a diameter satisfying a relation in which a detection mark on the recording medium is on a position away from a leading end of the recording medium by an integral multiple of a circumference of the drive roller in a conveyance direction of the recording medium.

16 Claims, 9 Drawing Sheets

(51) Int. Cl.
*G06K 15/14* (2006.01)
*B65H 5/06* (2006.01)

(52) U.S. Cl.
CPC .......... *G06K 15/14* (2013.01); *B65H 2404/14* (2013.01); *B65H 2511/11* (2013.01)

(58) Field of Classification Search
CPC ........ B65H 2701/1241; B65H 2801/06; B65H 5/062; G03G 15/5062; G03G 15/6529; G03G 15/6567; G06K 15/14; G06K 15/16
USPC .................................................. 358/497, 498
See application file for complete search history.

(56) References Cited

U.S. PATENT DOCUMENTS

| | | |
|---|---|---|
| 2014/0314281 A1 | 10/2014 | Kojima et al. |
| 2015/0378297 A1 | 12/2015 | Nakura et al. |
| 2016/0182753 A1 | 6/2016 | Takahashi et al. |
| 2017/0131671 A1 | 5/2017 | Nishimura et al. |
| 2017/0153591 A1 | 6/2017 | Nakura et al. |
| 2019/0202648 A1* | 7/2019 | Nakayama ................ B65H 7/08 |
| 2019/0300310 A1* | 10/2019 | Ishii .................... H04N 1/00785 |
| 2020/0165088 A1* | 5/2020 | Maeyama .......... G03G 15/6567 |
| 2020/0301326 A1 | 9/2020 | Yamazaki et al. |
| 2020/0319585 A1* | 10/2020 | Hirose ............... G03G 15/5062 |
| 2021/0356895 A1* | 11/2021 | Yamamura .......... G03G 15/5058 |
| 2022/0113663 A1* | 4/2022 | Yamamura .......... G03G 21/1889 |

FOREIGN PATENT DOCUMENTS

| | | |
|---|---|---|
| JP | 2012-165296 | 8/2012 |
| JP | 2014-074711 | 4/2014 |
| JP | 2015-029192 | 2/2015 |
| JP | 2016-118777 | 6/2016 |
| JP | 2016-139026 | 8/2016 |
| JP | 2017-076845 | 4/2017 |
| JP | 2017-076846 | 4/2017 |
| JP | 2017-088265 | 5/2017 |
| JP | 2017-228165 | 12/2017 |

* cited by examiner

- · - : CENTER POSITION OF DETECTION MARK

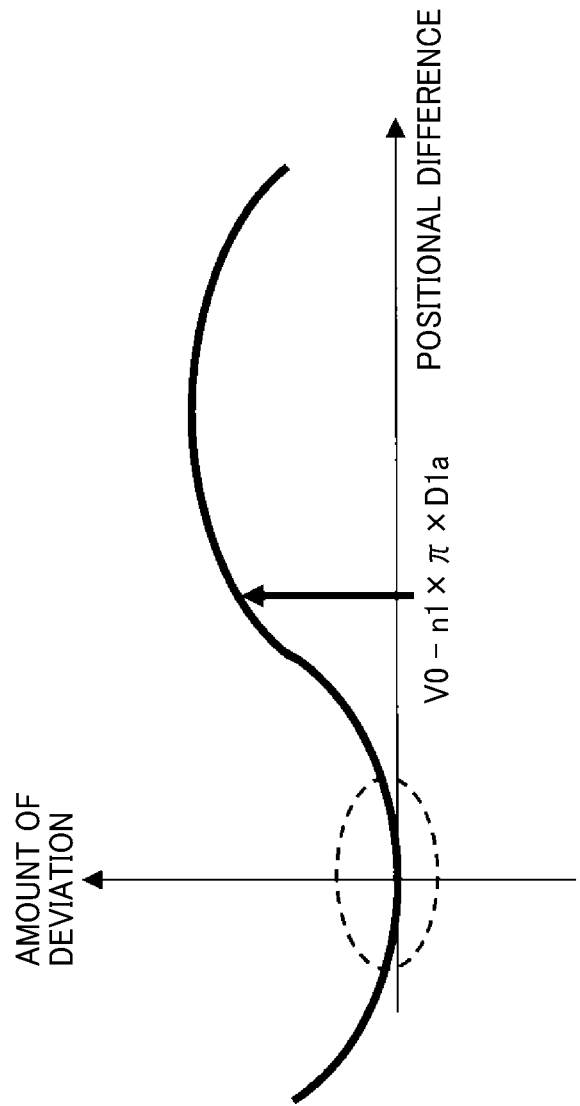

CONVEYANCE DEVICE, IMAGE READING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2019-217111, filed on Nov. 29, 2019 and 2020-185932, filed on Nov. 6, 2020, in the Japan Patent Office, the entire disclosure of each of which is hereby incorporated by reference herein.

BACKGROUND

Technical Field

Embodiments of the present disclosure relate to a conveyance device, an image reading device, and an image forming apparatus.

Description of the Related Art

There is known a conveyance device that includes a first conveyance roller pair to convey a recording medium to an image reading position of an image reading unit. The first conveyance roller pair includes a first drive roller and a first driven roller that contacts the first drive roller and rotates following the first drive roller.

SUMMARY

Embodiments of the present disclosure describe an improved conveyance device that includes a conveyance roller pair to convey a recording medium to an image reading position of an image reading unit. The conveyance roller pair includes a drive roller and a driven roller. The driven roller contacts the drive roller and rotates following the drive roller. The drive roller has a diameter satisfying a relation in which a detection mark on the recording medium is on a position away from a leading end of the recording medium by an integral multiple of a circumference of the drive roller in a conveyance direction of the recording medium.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is a graph illustrating a relation between; a positional difference between the position of a front detection mark of the detection pattern and the position away from the leading end of the sheet by an integral multiple of the circumference of a first drive conveyance roller of the image reading device, and an amount of deviation between the position of the front detection mark of a scanned image read by the image reading device and the position of the front detection mark on the sheet P;

Figure 1:
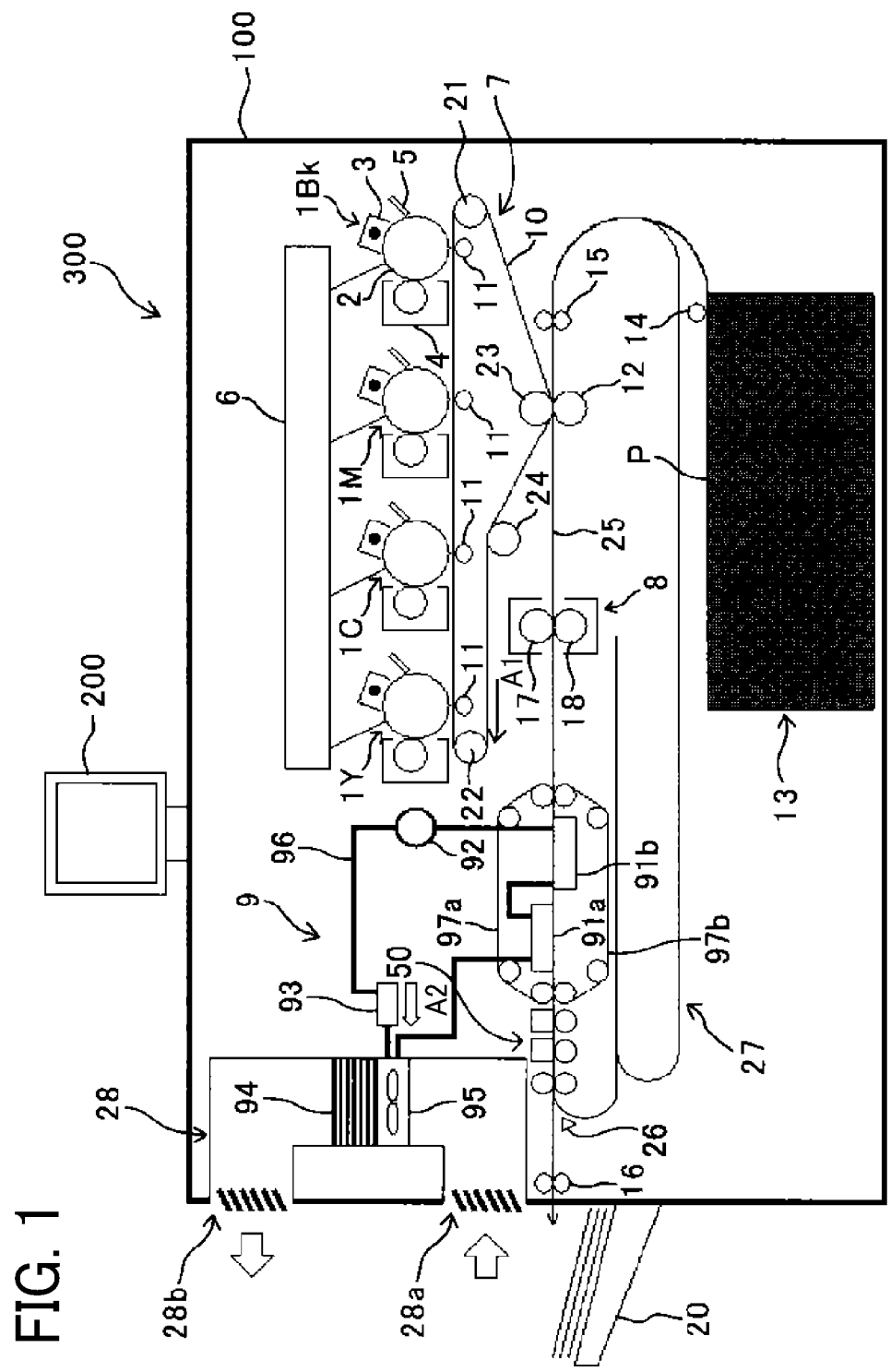
FIG. 1 is a schematic view illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that the suffixes Y, M, C, and Bk attached to each reference numeral indicate only that components indicated thereby are used for forming yellow, magenta, cyan, and black images, respectively, and hereinafter may be omitted when color discrimination is not necessary.

In a comparative example, an image forming apparatus includes a conveyance device to convey a recording medium to an image reading position of an image reading unit. The image forming apparatus performs image correction of images formed on a recording medium, such as skew correction, positional deviation correction, and the like. The image forming apparatus forms a cross-shaped detection marks near four corners of the recording medium, and the image reading unit reads the recording medium on which the detection marks are formed. Next, the position of each detection mark (e.g., the distance from the leading end of the recording medium in the conveyance direction to the detection mark and the distance from one end of the recording medium in the width direction to the detection mark) is pinpointed based on the scanned image. Then, based on the position of each pinpointed detection mark, the amount of skew of the images and the like are determined, and a predetermined image correction, such as the skew correction and the positional deviation correction, is performed.

However, due to the influence of fluctuation of the conveyance speed of the recording medium by the conveyance device, a positional deviation may occur between the position of the detection mark of the scanned image and the actual position of the detection mark on the actual recording medium. Accordingly, the image correction may not be performed with high accuracy.

According to the present disclosure, the image correction can be performed with high accuracy. A description is given below of a printer that is a full-color electrophotographic image forming apparatus according to an embodiment of the present disclosure.

The configuration of an image forming apparatus (printer) 300 according to the present embodiment are schematically described. FIG. 1 is a schematic view illustrating the configuration of the image forming apparatus 300 according to the present embodiment. The image forming apparatus 300 according to the present embodiment can function as a copier by adding an optional scanner to the upper portion of an apparatus body 100 thereof, and further as a multifunction peripheral having a facsimile function by adding an optional facsimile board inside the apparatus body 100.

As illustrated in FIG. 1, the image forming apparatus 300 according to the present embodiment includes a control panel 200 disposed on the apparatus body 100. The control panel 200 displays the operation state of the image forming apparatus 300, and a user can set the operation condition of the image forming apparatus 300 with the control panel 200. In the image forming apparatus 300, an image is formed by the electrophotographic method on a sheet P which is a sheet-shaped recording medium based on image data received from an external device such as a personal computer and the operation condition set by the control panel 200.

A description is given below of the configuration and operation of the apparatus body 100 that performs image formation in the image forming apparatus 300.

As illustrated in FIG. 1, the apparatus body 100 of the image forming apparatus 300 includes four process units 1Y, 1C, 1M, and 1Bk as image forming units and a transfer unit 7 including an intermediate transfer belt 10 as an intermediate transferor. The process units 1Y, 1C, 1M, and 1Bk are arranged in parallel on the stretched surface of the intermediate transfer belt 10 and constructs a tandem type image forming device together with the transfer unit 7. The process units 1Y, 1C, 1M, and 1Bk are removably installable in the apparatus body 100 and have the same configuration except for containing different color toners, i.e., yellow (Y), magenta (M), cyan (C), or black (Bk) toners, respectively, corresponding to decomposed color components of full-color images.

Specifically, the process unit 1 includes a drum-shaped photoconductor 2 as an electrostatic latent image bearer, a charging device 3 to charge the surface of the photoconductor 2, a developing device 4 to form a toner image on the surface of the photoconductor 2. The process unit 1 further includes a cleaning blade 5 as a cleaning device to clean the surface of the photoconductor 2. In FIG. 1, reference numerals of the photoconductor 2, the charging device 3, the developing device 4, and the cleaning blade 5 are indicated in the process unit 1Bk but are omitted in the process units 1Y, 1C, and 1M for simplicity.

As illustrated in FIG. 1, an exposure device 6 to expose the surface of the photoconductor 2 is disposed above the process units 1Y, 1C, 1M, and 1Bk. The exposure device 6 includes a light source, a polygon mirror, an f-O lens, and reflection mirrors to irradiate the surfaces of the photoconductors 2 with laser beams according to the image data.

The transfer unit 7 is disposed below the process units 1Y, 1C, 1M, and 1Bk. As described above, the transfer unit 7 includes the intermediate transfer belt 10 that is an endless belt as the intermediate transferor. The inner circumferential surface of the intermediate transfer belt 10 is stretched around a first stretch roller 21, a second stretch roller 22, and a third stretch roller 23 as supports, and a tension roller 24 presses the intermediate transfer belt from the outer circumferential surface toward the inner circumferential surface, thereby applying tension to the intermediate transfer belt 10. As a drive roller rotates, which is one of the first stretch roller 21, the second stretch roller 22, and the third stretch roller 23, the intermediate transfer belt 10 rotates in the clockwise direction indicated by arrow A1 in FIG. 1.

Four primary transfer rollers 11 are disposed opposite the respective four photoconductors 2 via the intermediate transfer belt 10. At the position opposite the corresponding photoconductor 2, each of the primary transfer rollers 11 presses the inner circumferential surface of the intermediate transfer belt 10 against the corresponding photoconductor 2 to form a primary transfer nip where a pressed portion of the intermediate transfer belt 10 contacts the photoconductor 2. The primary transfer rollers 11 are electrically connected to a power source, and a predetermined voltage that is either direct current (DC) voltage, alternating current (AC) voltage, or including both is applied to the primary transfer rollers 11.

A secondary transfer roller 12 is disposed opposite the third stretch roller 23 that stretches the intermediate transfer belt 10. The secondary transfer roller 12 is pressed against the outer circumferential surface of the intermediate transfer belt 10 to form a secondary transfer nip where the secondary transfer roller 12 contacts the intermediate transfer belt 10. Similarly to the primary transfer rollers 11, the secondary transfer roller 12 is electrically connected to a power source, and a predetermined voltage that is either DC voltage, AC voltage, or including both is applied to the secondary transfer roller 12.

A plurality of sheet feeding trays 13 is disposed at the lower portion of the apparatus body 100 to accommodate sheets P as sheet-shaped recording media, such as paper sheets, overhead projector (OHP) transparencies, and the like. A sheet feeding roller 14 is provided in the sheet feeding tray 13 to feeds the sheets P accommodated in the sheet feeding tray 13. A sheet ejection tray 20 is disposed on the left outer surface of the side plate of the apparatus body 100 in FIG. 1. The sheets P ejected from the apparatus body 100 are stacked on the sheet ejection tray 20.

A conveyance path 25 is formed inside the apparatus body 100, and the sheet P is conveyed from the sheet feeding tray 13 to the sheet ejection tray 20 via the secondary transfer nip along the conveyance path 25. Along the conveyance path 25, a registration roller pair 15 is disposed upstream from the secondary transfer roller 12 in a direction of conveyance of the sheet P (hereinafter referred to as a conveyance direction). A fixing device 8, a cooling device 9, an image reading device 50, and an output roller pair 16 are disposed downstream from the secondary transfer roller 12 in the conveyance direction in order. The fixing device 8 includes, for example, a fixing roller 17 including a heater therein and a pressure roller 18 that presses the fixing roller 17. The portion where the fixing roller 17 and the pressure roller 18 contact each other is referred to as a fixing nip.

A switching pawl 26 is disposed between the image reading device 50 and the output roller pair 16. A reverse path 27 is formed between the sheet feeding trays 13, and fixing device 8 and the cooling device 9. When the duplex printing, in which images are formed on both sides of the sheet P, is selected among printing modes as image formation modes, the switching pawl 26 swings to guide the sheet P from the conveyance path 25 to the reverse path 27. The sheet P guided to the reverse path 27 switchbacks in the reverse path 27 to reverse the front and back surfaces of the sheet P. Then the sheet P enters the conveyance path 25 upstream from the registration roller pair 15 to form an image on the back surface of the sheet P.

The cooling device 9 includes a front side belt 97a and a back side belt 97b. The front side belt 97a is an endless cooling belt that removes heat from the front surface of the sheet P, while conveying the sheet P. The back side belt 97b is an endless cooling belt that removes heat from the back surface of the sheet P, while conveying the sheet P. The sheet P is conveyed, while being sandwiched between the stretched surfaces of the front side belt 97a and the back side belt 97b. The cooling device 9 further includes a front side cooling plate 91a and a back side cooling plate 91b. The front side cooling plate 91a is disposed inside the stretched surface of the front side belt 97a. The back side cooling plate 91b is disposed inside the stretched surface of the back side belt 97b. Further, the cooling device 9 includes a pump 92, a tank 93, a radiator 94, and a cooling fan 95. The front side cooling plate 91a and the back side cooling plate 91b are heat receivers that receive the heat from the sheet P. The tank 93 stores a coolant. Pipes 96 are coupled to the inlet and outlet provided in each of the front side cooling plate 91a and the back side cooling plate 91b, and the coolant is circulated between the front side cooling plate 91a, the back side cooling plate 91b, the radiator 94, the tank 93, and the pump 92 via the pipes 96, thereby forming a circulation path. The pump 92 transports the coolant stored in the tank 93 through the pipes 96. The front side cooling plate 91a and the back side cooling plate 91b transfer the heat from the sheet P to the coolant. The radiator 94 dissipates the heat removed by the coolant to the outside of the image forming apparatus 300. The cooling fan 95 is attached to the radiator 94 and generates an airflow around the radiator 94 to cool the radiator 94.

As indicated by arrow A2, in the circulation path, the coolant is cooled by the radiator 94 and supplied to the front side cooling plate 91a and the back side cooling plate 91b through the circulation path. Then, the coolant is discharged from the back side cooling plate 91b through the front side cooling plate 91a. After that, the coolant is transported to the pump 92 and the tank 93, and then returned to the radiator 94 again. The coolant is circulated by the pump 92, and the radiator 94 dissipates heat to cool the coolant, thereby cooling the front side cooling plate 91a and the back side cooling plate 91b. The liquid transport capacity of the pump 92 and the size of the radiator 94 are based on the flow rate, pressure, cooling efficiency, and the like determined by thermal design conditions (e.g., conditions of the amount of heat removed by the front side cooling plate 91a and the back side cooling plate 91b and the temperature of the front side cooling plate 91a and the back side cooling plate 91b).

The cooling fan 95 and the radiator 94 are disposed in a duct 28. The duct 28 is arranged inside the side plate of the apparatus body 100 on which the sheet ejection tray 20 is disposed. When the cooling fan 95 is driven (rotated), low temperature air is suck into the duct 28 through an intake port 28a. Then the air passes through the cooling fan 95 and the radiator 94, thereby becoming high temperature. The high temperature air is exhausted from an exhaust port 28b. The intake port 28a is disposed in the lower portion of the duct 28, and the exhaust port 28b is disposed in the upper portion of the duct 28 in FIG. 1.

Next, a description is given of the basic operation of the image forming apparatus 300 when the single-sided printing is selected among the printing modes. As the image forming apparatus 300 receives image data from an external device such as a personal computer and starts the image forming operation, the photoconductor 2 of each of the process units 1Y, 1C, 1M, and 1Bk rotates counterclockwise in FIG. 1, and the charging device 3 uniformly charges the surface of the photoconductor 2 in a predetermined polarity. Then, the exposure device 6 irradiates the charged surfaces of the respective photoconductors 2 with laser beams based on the image data received from the external device and processed by an image processor. Thus, electrostatic latent images are formed on the surfaces of the respective photoconductors 2. At this time, the image data for exposing the photoconductor 2 is single-color image data obtained by decomposing a desired full-color image into individual color components, that is, yellow, cyan, magenta, and black components. The electrostatic latent image thus formed on the photoconductor 2 is developed into a toner image (visible image) with toner deposited by the developing device 4.

The intermediate transfer belt 10 rotates in the direction indicated by arrow A1 in FIG. 1 as the drive roller rotates, which is one of the stretch rollers 21 to 23 around which the intermediate transfer belt 10 is stretched. The power source applies a constant voltage or a voltage controlled at a constant current, which has a polarity opposite a polarity of the charged toner, to the primary transfer rollers 11. As a result, primary transfer electric fields are generated at the respective primary transfer nips between the primary transfer rollers 11 and the photoconductors 2. The primary transfer electric fields generated at the primary transfer nips sequentially transfer and superimpose the toner images of respective colors from the photoconductors 2 onto the intermediate transfer belt 10. Thus, a full-color toner image, which is the superimposed toner images, is formed on the surface of the intermediate transfer belt 10. Residual toner remaining on the photoconductor 2 failed to be transferred onto the intermediate transfer belt 10 is removed by the cleaning blade 5 in preparation for subsequent image formation.

Meanwhile, as the sheet feeding roller 14 rotates, the sheet P is fed out from the sheet feeding tray 13. The registration roller pair 15 forwards the sheet P fed from the sheet feeding tray 13 to the secondary transfer nip between the secondary transfer roller 12 and the intermediate transfer belt 10 at appropriate timing to synchronize with the arrival of the toner images carried on the intermediate transfer belt 10. At that time, a secondary transfer voltage opposite in polarity to the toner images on the intermediate transfer belt 10 is applied to the secondary transfer roller 12, and a secondary transfer electric field is generated in the secondary transfer nip. The secondary transfer electric field generated in the secondary transfer nip collectively transfers the toner images (full-color toner image) from the intermediate transfer belt 10 onto the sheet P.

The sheet P bearing the full-color toner image is then conveyed to the fixing device 8. The fixing roller 17 and the pressure roller 18 apply heat and pressure to the sheet P to fix the full-color toner image on the sheet P. The cooling device 9 cools the sheet P, and the output roller pair 16 ejects the sheet P onto the sheet ejection tray 20. By cooling the sheet P by the cooling device 9, the toner on the sheet P can be reliably cured at the time when the sheet P is stacked on the sheet ejection tray 20.

Described above is the image forming operation to form a full-color toner image on the sheet P. Alternatively, the image forming apparatus 300 may form a monochrome toner image by using any one of the four process units 1Y, 1C, 1M, and 1Bk, or may form a bicolor toner image or a tricolor toner image by using two or three of the process units 1Y, 1C, 1M, and 1Bk.

Figure 2:
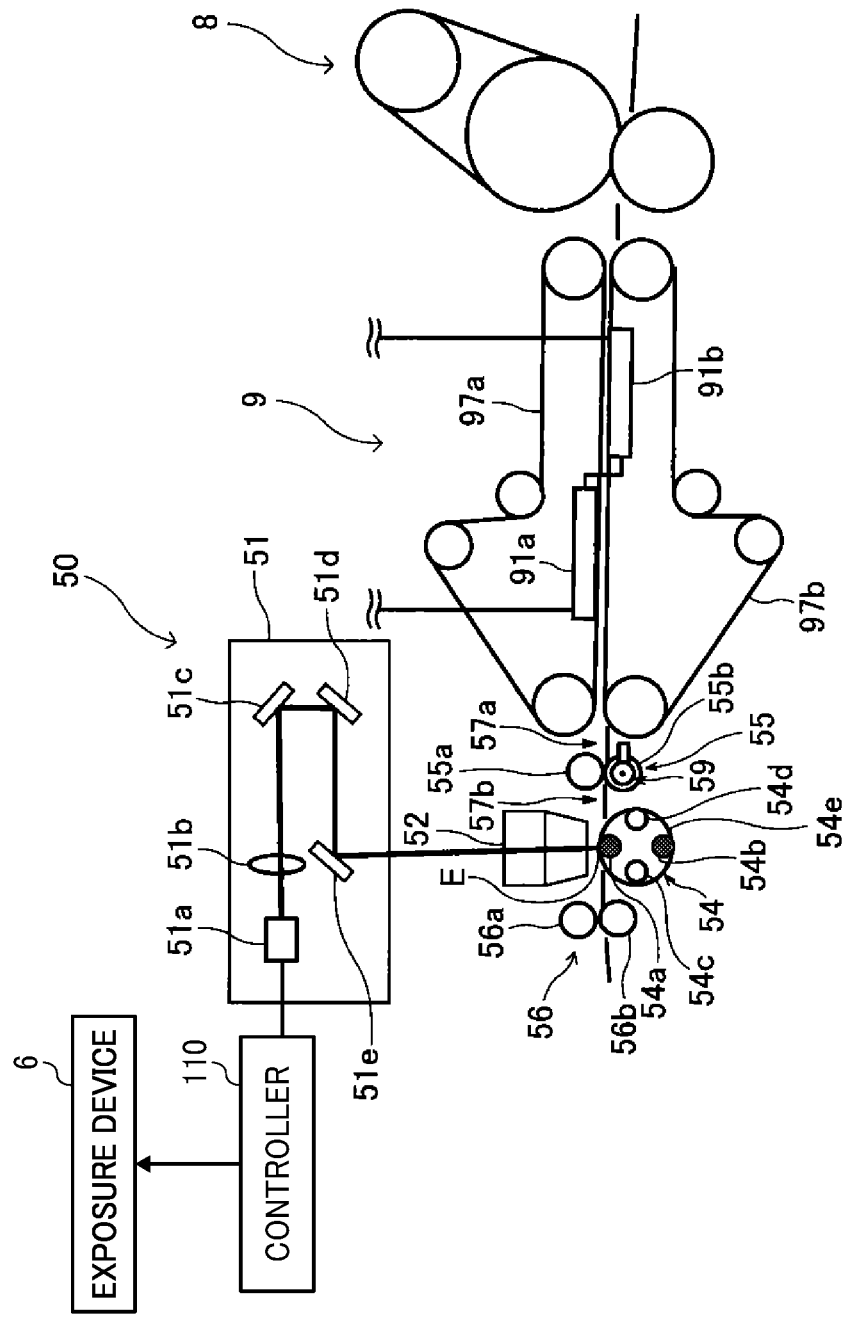
FIG. 2 is a schematic view illustrating a configuration of a sheet conveyor including a fixing device, a cooling device, and an image reading device according to an embodiment of the present disclosure.

FIG. 2 is a schematic view illustrating the configuration of a sheet conveyor including the fixing device 8, the cooling device 9, and the image reading device 50. The sheet P after the cooling process by the cooling device 9 is then conveyed to the image reading device 50. The image reading device 50 includes a reader 51, an illumination unit 52, a background member 54, a first conveyance roller pair 55 including a first drive conveyance roller 55a and a first driven conveyance roller 55b, and a second conveyance roller pair 56 including a second drive conveyance roller 56a and a second driven conveyance roller 56b. The first conveyance roller pair 55 and the second conveyance roller pair 56 construct a conveyance device to convey the sheet P in the image reading device 50. The reader 51, the illumination unit 52, and the background member 54 construct an image reading unit to read an image on the sheet P being conveyed. The reader 51 includes an image sensor 51a, a lens 51b, mirrors 51c, 51d, and 51e, and the like to read an image on the sheet P illuminated by the illumination unit 52.

The first drive conveyance roller 55a and the second drive conveyance roller 56a are elastic rollers provided with an elastic layers, and the first driven conveyance roller 55b and the second driven conveyance roller 56b are hard rollers such as metal rollers. The first and second driven conveyance rollers 55b and 56b are movably supported in the direction to contact and separate from the first and second drive conveyance rollers 55a and 56a, and pressed against the first and second drive conveyance rollers 55a and 56a by biasing members such as springs, respectively, to form conveyance nips. Note that the first and second driven conveyance rollers 55b and 56b may be elastic rollers provided with elastic layers, and the first and second drive conveyance rollers 55a and 56a may be hard rollers such as metal rollers.

Further, in the present embodiment, the first and second driven conveyance rollers 55b and 56b are arranged on the background member 54 side with respect to the conveyance path 25 of the sheet P. Alternatively, the first and second drive conveyance rollers 55a and 56a may be arranged on the background member 54 side and the first and second driven conveyance rollers 55b and 56b may be arranged on the reader 51 side.

The background member 54 is disposed at an image reading position by the reader 51 where the sheet P is illuminated by the illumination unit 52. The first conveyance roller pair 55 and the second conveyance roller pair 56 convey the sheet P at the image reading position. Illumination light from the illumination unit 52 is reflected by the sheet P and enters the reader 51. The reader 51 starts reading an image with the image sensor 51a immediately before the leading end of the sheet P enters the image reading position, and finishes reading the image with the image sensor 51a immediately after the trailing end of the sheet P exits the image reading position. As a result, the reader 51 can read the image on the sheet P and the outline of the sheet P for each sheet P.

The background member 54 of the image reading device 50 according to the present embodiment includes a large-diameter black roller 54a having a black outer circumference, a small-diameter black roller 54b having a black outer circumference, a large-diameter white roller 54c having a white outer circumference, and a small-diameter white roller 54d having a white outer circumference (hereinafter, simply referred to as "rollers 54a, 54b, 54c, and 54d"). These four rollers 54a, 54b, 54c, and 54d are rotatably supported by a rotary support 54e. As the rotary support 54e rotates, one of the rollers 54a, 54b, 54c, and 54d is located at the image reading position. The background member 54 positions the corresponding one of the rollers 54a, 54b, 54c, and 54d at the image reading position depending on data of the sheet P that identifies the thickness, the color, and the like of the sheet P, and the operation mode of the image forming system (e.g., difference in conveyance speed).

The gap between the illumination unit 52 and the one of the rollers 54a, 54b, 54c, and 54d of the background member 54 at the image reading position is preferably narrow enough to reliably convey the sheet P. Further, the second conveyance roller pair 56 is preferably driven with high accuracy and controlled so that the sheet P does not bend directly under the illumination unit 52. In particular, two types of transport paths, i.e., the reverse path 27 and a sheet ejection path, are disposed, and a curl correction mechanism may be disposed downstream from the second conveyance roller pair 56. Thus, there may be many error factors that deteriorate the conveyance performance downstream from the second conveyance roller pair 56. Therefore, preferably, the conveyance force of the second conveyance roller pair 56 is increased and the rotation unevenness of the second conveyance roller pair 56 is reduced in order to maintain the reading performance.

A rotary encoder 59 is disposed on one end of the rotation shaft of the first driven conveyance roller 55b. The rotary encoder 59 includes an encoder disc and an encoder sensor. The encoder disc is secured onto the rotation shaft of the first driven conveyance roller 55b and rotates together with the first driven conveyance roller 55b. The encoder sensor detects a slit formed in the encoder disc.

Although the rotary encoder 59 is disposed on the rotation shaft of the first driven conveyance roller 55b in the present embodiment, the rotary encoder 59 may be disposed on the rotation shaft of the first drive conveyance roller 55a. A driven conveyance roller to which the rotary encoder 59 is attached is preferably a metal roller in order to secure the accuracy of runout of the rotation shaft.

As the first driven conveyance roller 55b rotates, a pulse is generated from the rotary encoder 59 on the rotation shaft. A pulse measuring instrument is coupled to the rotary encoder 59, and the number of pulses from the rotary encoder 59 is measured by the pulse measuring instrument.

A stop trigger sensor 57a is disposed on the upstream side of the first conveyance roller pair 55 in the conveyance direction, and a start trigger sensor 57b is disposed on the downstream side of the first conveyance roller pair 55 in the conveyance direction. The stop trigger sensor 57a and the start trigger sensor 57b detect the end of the sheet P passing through in the conveyance direction. For example, a transmissive photosensor or reflective photosensor having high detection accuracy of the end of the sheet P is available for the stop trigger sensor 57a and the start trigger sensor 57b. In the present embodiment, the reflective photosensor is used.

The start trigger sensor 57b detects the leading end of the sheet P in the conveyance direction. The stop trigger sensor 57a detects the trailing end of the sheet P and the rear end of a detection image.

In the present embodiment, the length of the sheet P in the conveyance direction is measured by the stop trigger sensor 57a, the start trigger sensor 57b, and the rotary encoder 59. Specifically, the length of the sheet P in the conveyance direction is measured as follows.

As described above, as the first driven conveyance roller 55b rotates, a pulse signal is generated from the rotary encoder 59. When the start trigger sensor 57b detects the passage of the leading end of the sheet P, the rotary encoder 59 starts measuring the number of pulses, and when the stop trigger sensor 57a detects the passage of the trailing end of the sheet P, the rotary encoder 59 finishes measuring the number of pulses.

The length Lt of the sheet P in the conveyance direction is expressed by the following expression.

$$Lt = A + B + (nx/N) \times \pi \times D1b \quad \text{Expression 1,}$$

where D1b represents the diameter of the first driven conveyance roller 55b onto which the rotary encoder 59 is attached, N represents the number of pulses of the rotary encoder 59 during one rotation of the first driven conveyance roller 55b, and nx represents the number of pulses after the start trigger sensor 57b detects the passage of the leading end of the sheet P until the stop trigger sensor 57a detects the passage of the trailing end of the sheet P. Further, A represents the conveyance distance from the stop trigger sensor 57a to the first conveyance roller pair 55, and B represents the conveyance distance from the first conveyance roller pair 55 to the start trigger sensor 57b.

Generally, the conveyance speed of the sheet P fluctuates depending on mechanical tolerances such as external dimensional tolerances of the roller (in particular, the drive roller) that conveys the sheet P and the runout of the shaft. Accordingly, the pulse cycle and the pulse width of the rotary encoder 59 constantly fluctuate, but the number of pulses does not change. Therefore, the length Lt of the sheet P in the conveyance direction can be obtained without depending on the conveyance speed of the sheet P by Expression 1.

Figure 3:
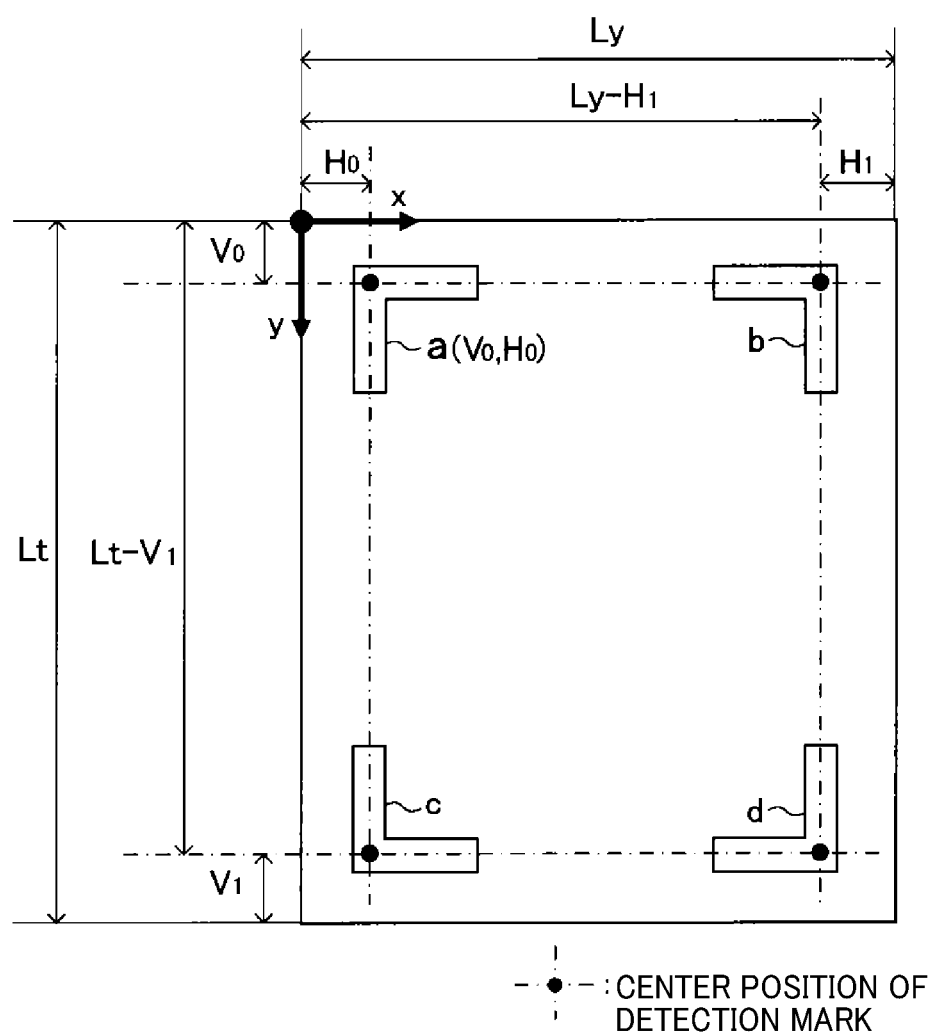
FIG. 3 is a schematic view illustrating an example of a detection pattern formed on a sheet for image alignment according to an embodiment of the present disclosure.

FIG. 3 is a schematic view illustrating an example of a detection pattern formed on the sheet P for image alignment. The image forming apparatus 300 has an adjustment mode to align an image. The image forming apparatus 300 forms L-shaped detection marks a, b, c, and d near the four corners on the sheet P when the adjustment mode is automatically (for example, when the image forming apparatus 300 is turned on) or manually selected. The sheet P on which the detection marks a, b, c, and d have been formed is conveyed to the image reading device 50 via the fixing process by the fixing device 8 and the cooling process by the cooling device 9.

The first conveyance roller pair 55 and the second conveyance roller pair 56 conveys the sheet P in the image reading device 50. The reader 51 of the image reading unit optically reads the end of the sheet P and the detection marks a, b, c, and d. Then, a controller 110 (see FIG. 2) calculates the coordinates (e.g., H0, V0) of the center position of each of the detection marks a, b, c, and d on the sheet P based on the length Lt of the sheet P in the conveyance direction calculated by Expression 1. Specifically, a scale for the scanned image is defined based on the length Lt of the sheet P in the conveyance direction calculated by Expression 1, and the coordinates (e.g., H0, V0) of the center position of each of the detection marks a, b, c, and d are calculated based on the scale. Note that, instead of the L-shaped detection marks a, b, c, and d illustrated in FIG. 3, detection marks having a shape such as a cross, a rectangle, or a straight line may be used.

Figure 6A:
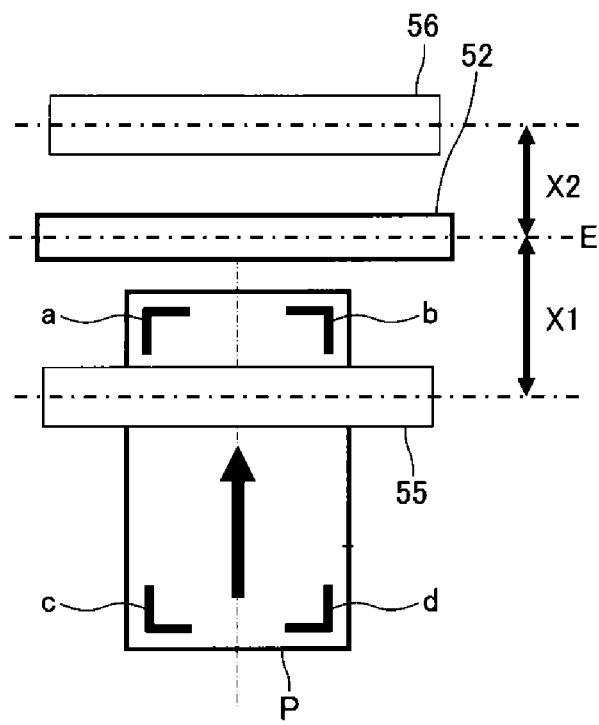
FIGS. 6A and 6B are schematic views illustrating a dimensional relation of the image reading device.

For example, the coordinate V0 of the front detection mark a in the conveyance direction (i.e., a distance V0 from the leading end of the sheet P to the center position of the front detection mark a) are obtained as follows. First, the position of the leading end of the sheet P, which is the origin in the conveyance direction, is pinpointed. In the present embodiment, in the case of a white sheet P, the black roller (i.e., the large-diameter black roller 54a or the small-diameter black roller 54b) of the background member 54 is positioned at the image reading position, and the image reading is started before the leading end of the sheet P passes through the image reading position. Therefore, the front side of the scanned image is black. The controller 110 detects a position P1 of the edge portion at which the scanned image turns from black to white first from the front side of the scanned image in the conveyance direction. The position P1 detected by the controller 110 corresponds to the leading end of the sheet P, that is, the origin in the conveyance direction. In the present embodiment, the detection marks a, b, c, and d are painted, for example, in solid black as illustrated in FIG. 6A but outlined in FIG. 3 for understanding the coordinates of the center positions of the detection marks a, b, c, and d. The controller 110 detects a position P2 of the edge portion at which the scanned image turns from white to black, and further, a position P3 of the edge portion at which the scanned image turns from black to white at the lateral bar portion of the front detection mark a. The position P2 corresponds to the front end of the front detection mark a. The position P3 corresponds to the rear end of the lateral bar portion of the front detection mark a. In FIG. 3, the origin is the upper left corner of the sheet P, and the coordinate V0 in the conveyance direction of the center position of the front detection mark a is obtained by the expression of (P3+P2−2×P1)/2. The front detection mark b is disposed on the other side in the width direction and on the front side of the sheet P, and the coordinate of the front detection mark b is similarly obtained.

The coordinate H0 in the width direction of the center position of the front detection mark a can also be obtained in the same manner. That is, in the width direction, the controller 110 detects a position Pa of the edge portion (i.e., one side end of the sheet P) as the origin in the width direction at which the scanned image turns from black to white first from one side of the scanned image. Then, the controller 110 detects a position Pb of the edge portion at which the scanned image turns from white to black, and further, a position Pc of the edge portion at which the scanned image turns from black to white at the longitudinal bar portion of the front detection mark a. The position Pb corresponds to the one side end of the longitudinal bar portion of the front detection mark a. The position Pc corresponds to the other side end of the longitudinal bar portion of the front detection mark a. When the origin is the upper left corner of the sheet P in FIG. 3 as described above, the coordinate H0 in the width direction of the center position of the front detection mark a is obtained by the expression of (Pc+Pb−2×Pa)/2. The rear detection mark c is disposed on the one side in the width direction and on the rear side of the sheet P, and the coordinate in the width direction of the rear detection mark c is similarly obtained.

The coordinates in the conveyance direction of the rear detection marks c and d disposed on the rear side of the sheet P in the conveyance direction are obtained as follows. In the conveyance direction, the controller 110 detects a position P4 at which the scanned image turns to white from the rear side of the scanned image as the trailing end of the sheet P. Then, the controller 110 detects a position P5 at which the scanned image turns from white to black at the lateral bar portion of the rear detection mark c (or d), and further, a position P6 at which the scanned image turns from black to white at the lateral bar portion. Accordingly, a distance V1 from the trailing end of the sheet P to the center position of the rear detection marks c and d is calculated by the expression of (P6+P5−2×P4)/2. The coordinate (Lt−V1) in the conveyance direction of the center position of the rear detection marks c and d is obtained by subtracting the distance V1 from the length Lt of the sheet P.

The coordinates in the width direction of the detection marks b and d disposed on the other side of the sheet P in the width direction are obtained as follows. That is, in the width direction, the controller 110 detects a position Pd at which the scanned image turns to white from the other side of the scanned image as the other side end of the sheet P. Then, the controller 110 detects a position Pe at which the scanned image turns from white to black, and further, a position Pf at which the scanned image turns from black to white at the longitudinal bar portion of the detection marks b and d. Accordingly, a distance H1 from the other side end of the sheet P to the center position of the detection marks b and d on the other side in the width direction is calculated by the expression of (Pf+Pe−2×Pd)/2. The coordinate (Ly−H1) in the width direction of the center position of the detection marks b and d is obtained by subtracting the distance H1 from the length Ly of the sheet P in the width direction.

Figure 4:
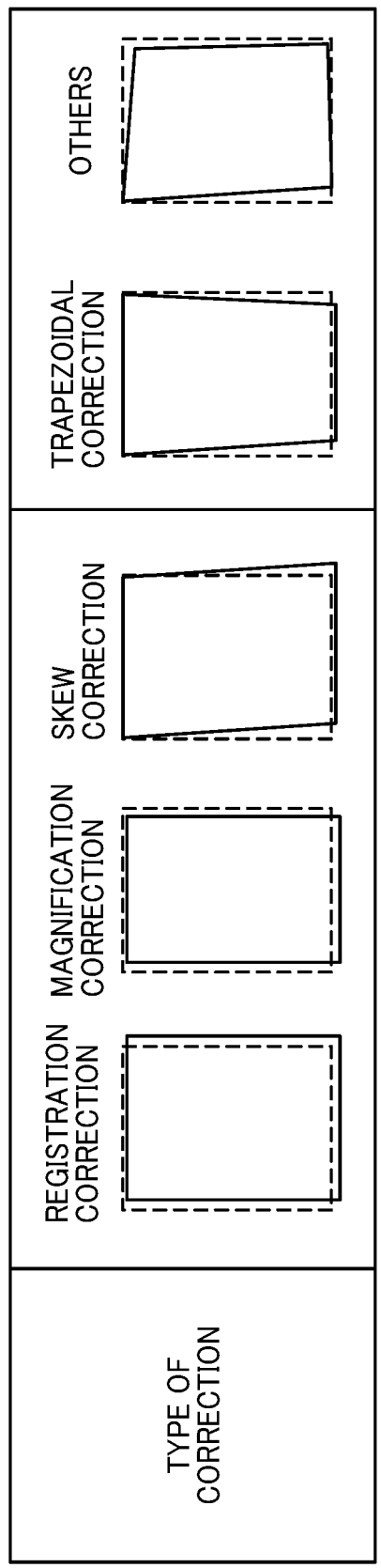
FIG. 4 is a schematic diagram illustrating types of image corrections.

FIG. 4 is a schematic diagram illustrating types of image corrections. The controller 110 calculates the amount of deviation (i.e., correction value) of the calculated center position of each of the detection marks a, b, c, and d from the target position, and corrects the writing timing or position of the exposure device 6 or image data for forming images so that each of the detection marks a, b, c, and d is formed at the target position. As illustrated in FIG. 4, the image forming apparatus according to the present embodiment performs various corrections to correct the image position, such as registration correction (that is, correction for translating the image position in the width direction or the conveyance direction of the sheet P), magnification correction, skew correction, trapezoidal correction, and other corrections. The type of correction is not limited to the above examples. These corrections can be performed by any known methods, and detailed description thereof is omitted.

Further, in the present embodiment, the output image on the sheet P read by the reader 51 is compared with the master image that is the original data of the output image, thereby inspecting the output image. Specifically, the controller 110 generates a difference image indicating the difference between the master image and the output image read by the reader 51 (i.e., the scanned image). Defects (defective pixels) that are not found in the master image remain in the generated difference image. If the number of the defects (defective pixels) is equal to or greater than the threshold, the controller 110 determines that the output image is a defective image. The inspection of the output image can be performed by any known methods, and detailed description thereof is omitted.

Further, in the present embodiment, the controller 110 corrects a gradation reproduction curve based on the full-color output image on the sheet P read by the reader 51 and the master image which is the original data of the output image to prevent the color output on the sheet P from fluctuating. Specifically, the controller 110 calculates the difference between the color of the master image and the color of the output image read by the reader 51 (i.e., the scanned image). Next, the controller 110 determines the amount of correction for correcting the current set value indicating the gradation reproduction curve of the image processing parameter based on the calculated difference. The control to prevent the fluctuation of the output color on the sheet P can be performed by any known methods, and detailed description thereof is omitted.

In the image forming apparatus 300 described above, the sheet P may be expanded or contracted, or deformed by the fixing process, and so-called front-back misregistration may occur in which the images formed on the front surface and the back surface of the sheet P are misaligned with each other.

In addition, due to cutting tolerances of the bundle of sheets P, one end of the sheet P or the other end of the sheet P may be tilted with respect to the conveyance direction. Here, the one end is the leading end of the sheet P and the other end is the trailing end of the sheet P in the conveyance direction when an image is formed on the front surface of the sheet P. When an image is formed on the back surface of the sheet P, the sheet P is reversed in switchback manner and conveyed to the secondary transfer nip again. Therefore, the other end of the sheet P, which is the trailing end of the sheet P in the conveyance direction when an image is formed on the front surface, becomes the leading end of the sheet P in conveyance direction when an image is formed on the back surface.

The leading end of the sheet P in the conveyance direction contacts the registration roller pair 15 before the sheet P is conveyed to the secondary transfer nip. If there are cutting tolerances of the bundle of sheets P, the posture of the sheet P when one end of the sheet P contacts the registration roller pair 15 is different from the posture of the sheet P when the other end of the sheet P contacts the registration roller pair 15. The one end is the leading end in the conveyance direction when an image is formed on the front surface of the sheet P, and the other end is the leading end in the conveyance direction when an image is formed on the back surface of the sheet P. As a result, the posture of the sheet P being conveyed when an image is transferred to the front surface of the sheet P and the posture of the sheet P being conveyed when an image is transferred to the back surface of the sheet P are different from each other. Accordingly, the front and back misregistration may occur due to the cutting tolerances of the bundle of sheet P.

Therefore, the image on the front surface is preferably aligned with the image on the back surface of the sheet P by the above-described corrections. When the images on the front and back surfaces are aligned with each other, the controller 110 causes the image forming apparatus 300 to transfer a detection pattern onto the front surface, fix the detection pattern, cool the sheet P, and read the detection marks on the front surface. In the same order, the controller 110 causes the image forming apparatus 300 to transfer a detection pattern onto the back surface, fix the detection pattern, cool the sheet P, and read the detection marks on the back surface. Then, based on the result of reading the detection patterns on the front and back surfaces, the controller 110 corrects the writing timing and position by the exposure device 6 and/or the image magnification of the image data so that the positions of the images on the front and back surfaces coincide with each other. This configuration can prevent the images on the front and back surfaces from being misaligned with each other.

Figure 5:
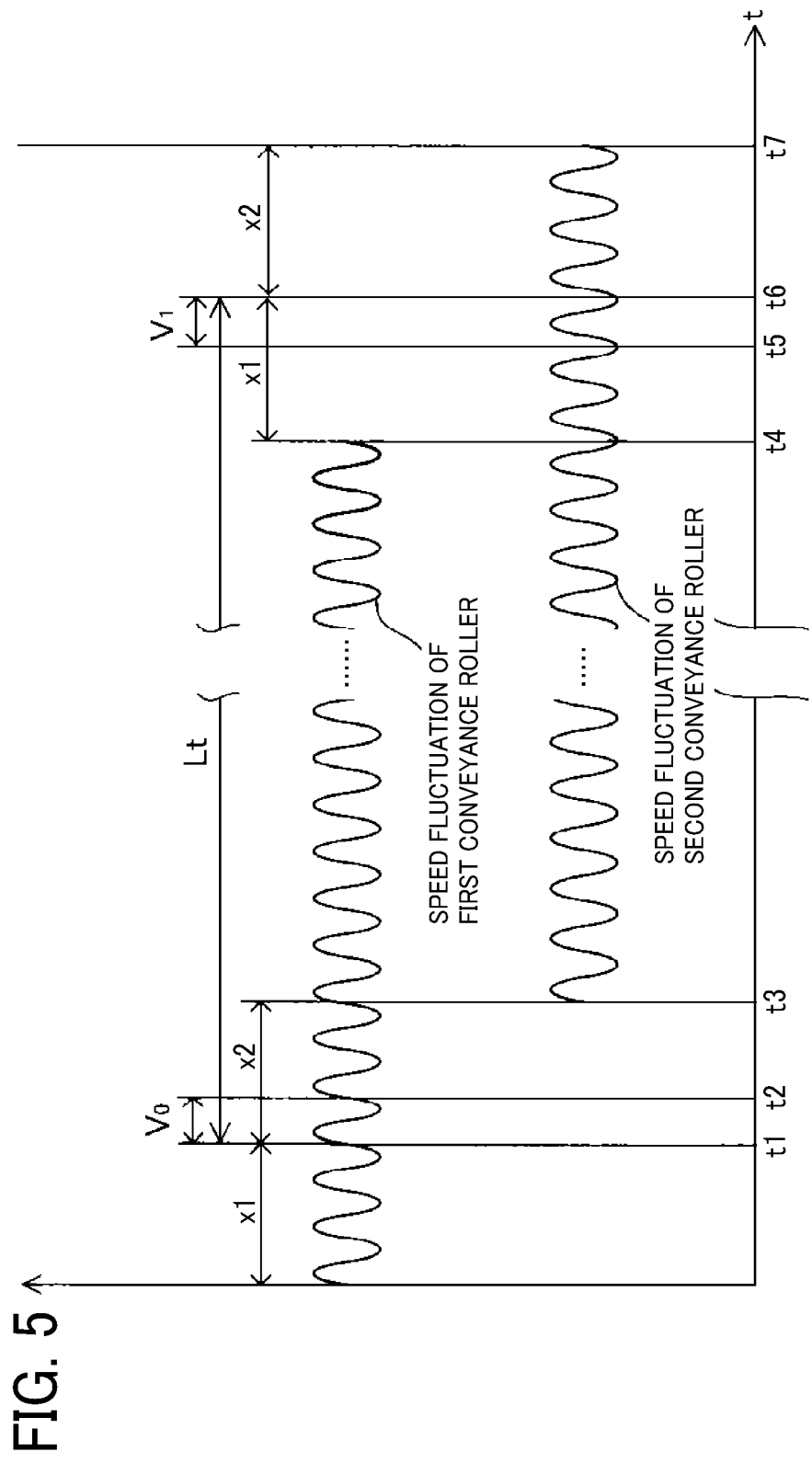
FIG. 5 is a graph illustrating conveyance of the sheet passing through the image reading device.
Figure 6B:
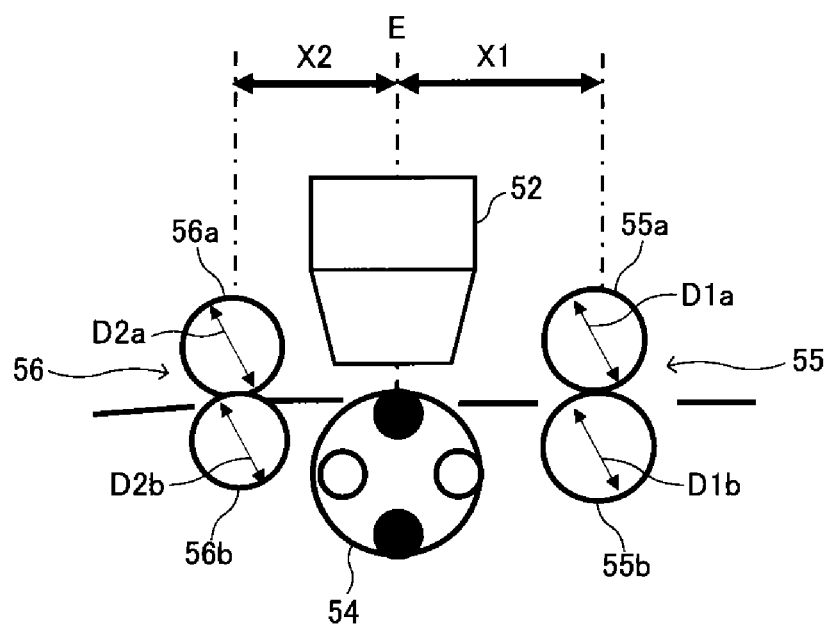

FIG. 5 is a graph illustrating conveyance of the sheet P passing through the image reading device 50. FIGS. 6A and 6B are schematic views illustrating a dimensional relation of the image reading device 50. In FIG. 5, t1 represents the time when the leading end of the sheet P passes through the image reading position, and t2 represents the time when the front detection marks a and b of the sheet P pass through the image reading position. In addition, in FIG. 5, t3 represents the time when the leading end of the sheet P passes through the second conveyance roller pair 56, and t4 represents the time when the trailing end of the sheet P passes through the first conveyance roller pair 55. Further, in FIG. 5, t5 represents the time when the rear detection marks c and d of the sheet P pass through the image reading position, and t6 represents the time when the trailing end of the sheet P passes through the image reading position. Furthermore, in FIG. 5, t7 represents the time when the trailing end of the sheet P passes through the second conveyance roller pair 56.

As illustrated in FIG. 5, due to the eccentricity of the first drive conveyance roller 55a of the first conveyance roller pair 55, the conveyance speed of the sheet P conveyed to the image reading position E fluctuates with the rotation cycle of the first drive conveyance roller 55a that applies conveyance force to the sheet P. Further, due to the eccentricity of the second drive conveyance roller 56a of the second conveyance roller pair 56, the conveyance speed of the sheet P passing through the image reading position E fluctuates with the rotation cycle of the second drive conveyance roller 56a that applies conveyance force to the sheet P.

Until the leading end of the sheet P reaches the second conveyance roller pair 56 (i.e., the time t3 in FIG. 5), the sheet P is conveyed by the first conveyance roller pair 55, and the conveyance speed of the sheet P fluctuates with the rotation cycle of the first drive conveyance roller 55a. Before the leading end of the sheet P reaches the second conveyance roller pair 56, the leading end of the sheet P passes through the image reading position E at the time t1 in FIG. 5, and the front detection marks a and b passes through the image reading position E at the time t2 in FIG. 5. Accordingly, A portion of the scanned image between the leading end and the position away from the leading end by a distance X2 (see FIGS. 6A and 6B) is affected by the fluctuation of the conveyance speed of the first drive conveyance roller 55a. Specifically, due to the fluctuation of the conveyance speed of the first drive conveyance roller 55a, the scanned image expands and contracts with the rotation cycle of the first drive conveyance roller 55a. When the scanned image expands and contracts, the actual positions of the front detection marks a and b on the sheet P in the conveyance direction (i.e., the distance from the leading end of the sheet P to the front detection marks a and b) may deviate from the positions of the front detection marks a and b of the scanned image in the conveyance direction. As a result, accurate image correction may not be performed based on the scanned image.

Further, after the trailing end of the sheet P passes through the first conveyance roller pair 55 (i.e., the time t4 in FIG. 5) until the trailing end of the sheet P reaches the image reading position E (i.e., the time t6 in FIG. 5), the sheet P is conveyed by the second conveyance roller pair 56, and the conveyance speed of the sheet P fluctuates with the rotation cycle of the second drive conveyance roller 56a. Therefore, due to the fluctuation of the conveyance speed of the second drive conveyance roller 56a, a portion of the scanned image between the trailing end of the sheet P and the position indicated by the coordinate (Lt−X1), i.e., the position away from the trailing end by a distance X1 (see FIGS. 6A and 6B), expands and contracts with the rotation cycle of the second drive conveyance roller 56a. Since the rear detection marks c and d are disposed from the position indicated by the coordinate (Lt−X1) of the scanned image to the trailing end of the sheet P, the actual distance from the trailing end of the sheet P to the rear detection marks c and d may deviate from the distance from the trailing end of the sheet P to the rear detection marks c and d of the scanned image in the conveyance direction. As a result, accurate image correction may not be performed based on the scanned image.

Therefore, in the present embodiment, the distance V0 from the leading end of the sheet P to the center position of the front detection marks a and b in the conveyance direction satisfies the following relation expressed by Expression 2.

$$V0 \approx n1 \times \pi \times D1a \qquad \text{Expression 2,}$$

where D1a represents the diameter of the first drive conveyance roller 55a, and n1 is an integer.

Due to the expansion and contraction of the scanned image with the rotation cycle of the first drive conveyance roller 55a, the actual positions of the front detection marks a and b on the sheet P in the conveyance direction (i.e., the distance from the leading end of the sheet P to the front detection marks a and b) may deviate from the positions of the front detection marks a and b of the scanned image in the conveyance direction. The deviation between the actual positions on the sheet P and the positions on the scanned image becomes 0 at the position away from the leading end of the sheet P by an integral multiple of the circumference of the first drive conveyance roller 55a. Therefore, by satisfying Expression 2 described above, the distance from the leading end of sheet P to the front detection marks a and b of the scanned image can substantially coincide with the actual distance from the leading end of sheet P to the front detection marks a and b on the sheet P. As a result, the registration correction can be performed with high accuracy based on the scanned image. In addition, the position of the image on the front surface of the sheet P can be accurately aligned with the position of the image on the back surface of the sheet P.

To satisfy Expression 2, the reference position for forming the front detection marks a and b is located at the position away from the leading end of the sheet P by an integral multiple of the circumference (π×D1a) of the first drive conveyance roller 55a. Thus, the detection marks a and b can be formed at the reference position. Alternatively, to satisfy Expression 2, the first drive conveyance roller 55a having a diameter satisfying the relation in which the distance from the leading end of the sheet P to the reference position is an integral multiple of the circumference (π×D1a) of the first drive conveyance roller 55a is used.

Further, in the present embodiment, the distance V1 from the center position of the rear detection marks c and d to the trailing end of the sheet P in the conveyance direction satisfies the following relation expressed by Expression 3.

$$V1 \approx n2 \times \pi \times D2a \qquad \text{Expression 3,}$$

where D2a represents the diameter of the second drive conveyance roller 56a, and n2 is an integer.

The actual distance from the trailing end of the sheet P to the rear detection marks c and d on the sheet P may deviate from the distance from the trailing end of the sheet P to the rear detection marks c and d of the scanned image. The deviation between the actual distance on the sheet P and the distance on the scanned image becomes 0 at the position away from the trailing end of the sheet P by an integral multiple of the circumference of the second drive conveyance roller 56a. Therefore, by satisfying Expression 3, the distance from the center position of the rear detection marks c and d of the scanned image to the trailing end of the sheet P in the conveyance direction can substantially coincide with the actual distance from the rear detection marks c and d on the sheet P to the trailing end of the sheet P. As a result, the magnification correction in the conveyance direction can be performed with high accuracy. In addition, the size of the image on the front surface of the sheet P can accurately coincide with the size of the image on the back surface of the sheet P.

To satisfy Expression 3, the reference position for forming the rear detection marks c and d is located at the position away from the trailing end of the sheet P by an integral multiple of the circumference ($\pi \times D2a$) of the second drive conveyance roller 56a. Thus, the rear detection marks c and d can be formed at the reference position. Alternatively, to satisfy Expression 3, the second drive conveyance roller 56a having a diameter satisfying the relation in which the distance from the trailing end of the sheet P to the reference position is an integral multiple of the circumference ($\pi \times D2a$) of the second drive conveyance roller 56a is used.

FIG. 7 is a graph illustrating an amount of deviation of the detection marks. The horizontal axis indicates the positional difference between the position of the front detection mark and the position away from the leading end of the sheet P by an integral multiple of the circumference ($\pi \times D1a$) of the first drive conveyance roller 55a, and the vertical axis indicates the amount of deviation between the position of the front detection mark of the scanned image and the actual position of the front detection mark on the sheet P.

As illustrated in FIG. 7, when there is not much positional difference between the position (distance V0) of the front detection mark formed on the sheet P and the position which is away from the leading end of the sheet P by an integral multiple of the circumference ($\pi \times D1a$) of the first drive conveyance roller 55a, that is, when the front detection mark is formed in the vicinity of the position away from the leading end of the sheet P by an integral multiple of the circumference of the first drive conveyance roller 55a, there is not much deviation between the actual position of the front detection mark formed on the sheet P and the position of the front detection mark of the scanned image. On the other hand, the positional difference between the position (distance V0) of the front detection mark and the position away from the leading end of the sheet P by an integral multiple of the circumference ($\pi \times D1a$) of the first drive conveyance roller 55a becomes larger (i.e., the front detection mark is separated from the position away from the leading end of the sheet P by an integral multiple of the circumference ($\pi \times D1a$) of the first drive conveyance roller 55a), the amount of deviation between the actual position of the front detection mark formed on the sheet P and the position of the front detection mark of the scanned image becomes larger.

Therefore, even if the position (distance V0) of the front detection mark on the sheet P is slightly separated from the position away from the leading end of the sheet P by an integral multiple of the circumference ($\pi \times D1a$) of the first drive conveyance roller 55a, the amount of deviation between the actual position of the front detection mark formed on the sheet P and the position of the front detection mark of the scanned image is small. As a result, the good image correction can be performed based on the scanned image. Therefore, the center position of the front detection mark in the conveyance direction does not need to completely coincide with the position away from the leading end of the sheet P by an integral multiple of the circumference ($\pi \times D1a$) of the first drive conveyance roller 55a. When the position away from the leading end of the sheet P by an integral multiple of the circumference ($\pi \times D1a$) of the first drive conveyance roller 55a falls within the range of the front detection mark in the conveyance direction, that is, when the front detection mark is on the position away from the leading end of the sheet P by an integral multiple of the circumference of the first drive conveyance roller 55a in the conveyance direction, the good image correction can be performed based on the scanned image.

Similarly, regarding the rear detection mark, even if the position (distance V1) of the rear detection mark on the sheet P is slightly separated from the position away from the trailing end of the sheet P by an integral multiple of the circumference ($\pi \times D2a$) of the second drive conveyance roller 56a, the amount of deviation between the actual distance from of the rear detection mark formed on the sheet P to the trailing end of the sheet P and the distance from the rear detection mark of the scanned image to the trailing end of the sheet P is small. As a result, the good image correction can be performed based on the scanned image. Therefore, the center position of the rear detection mark in the conveyance direction does not need to completely coincide with the position away from the trailing end of the sheet P by an integral multiple of the circumference ($\pi \times D2a$) of the second drive conveyance roller 56a. When the position away from the trailing end of the sheet P by an integral multiple of the circumference ($\pi \times D2a$) of the second drive conveyance roller 56a falls within the range of the rear detection mark in the conveyance direction, that is, when the rear detection mark is on the position away from the trailing end of the sheet P by an integral multiple of the circumference of the second drive conveyance roller 56a in the conveyance direction, the good image correction can be performed based on the scanned image.

Further, preferably, the diameter D1b of the first driven conveyance roller 55b is the same as the diameter D1a of the first drive conveyance roller 55a or an integral multiple of the diameter D1a of the first drive conveyance roller 55a. In the present embodiment, the nip pressure of the first conveyance roller pair 55 is increased so that the cooling device 9 disposed upstream from the first conveyance roller pair 55 in the conveyance direction does not affect the conveyance of the sheet P passing through the image reading position. The first drive conveyance roller 55a has the elastic layer, and the first driven conveyance roller 55b is the metal roller. Therefore, in the nip, the outer circumferential surface of the first drive conveyance roller 55a is deformed according to the curvature of the first driven conveyance roller 55b. Due to the eccentricity of the first driven conveyance roller 55b, the radius of curvature at the nip may change, and the conveyance speed of the sheet P may fluctuate with the rotation cycle of the first driven conveyance roller 55b.

As described above, the diameter D1b of the first driven conveyance roller 55b is preferably an integral multiple of the diameter D1a of the first drive conveyance roller 55a. With this configuration, the positional deviation between the position of the front detection marks a and b of the scanned image and the actual position of the front detection marks a and b on the sheet P due to the fluctuation of the conveyance speed with the rotation cycle of the first driven conveyance roller 55b can be prevented.

Further, preferably, the diameter D2b of the second driven conveyance roller 56b is an integral multiple of the diameter D2a of the second drive conveyance roller 56a. Also in the second conveyance roller pair 56, the second drive conveyance roller 56a has the elastic layer, and the second driven conveyance roller 56b is the metal roller. Further, as described above, the nip pressure of the second conveyance roller pair 56 is increased so that the mechanisms disposed downstream from the second conveyance roller pair 56 in the conveyance direction does not affect the conveyance of the sheet P passing through the image reading position, thereby enhancing the conveyance force. As a result, the outer circumferential surface of the second drive conveyance roller 56a is deformed according to the curvature of the second driven conveyance roller 56b in the nip of the second conveyance roller pair 56. Therefore, due to the eccentricity of the second driven conveyance roller 56b, the radius of curvature at the nip may change, and the conveyance speed of the sheet P may fluctuate with the rotation cycle of the second driven conveyance roller 56b.

Therefore, preferably, the diameter D2b of the second driven conveyance roller 56b is the same as the diameter D2a of the second drive conveyance roller 56a or an integral multiple of the diameter D2a of the second drive conveyance roller 56a. With this configuration, the deviation between the distance from the rear detection mark of the scanned image to the trailing end of the sheet P and the actual distance from the rear detection mark on the sheet P to the trailing end of the sheet P due to the fluctuation of the conveyance speed with the rotation cycle of the second driven conveyance roller 56b can be prevented.

Further, preferably, the diameter D2a of the second drive conveyance roller 56a is the same as the diameter D1a of the first drive conveyance roller 55a, and the cyclic fluctuation of the first drive conveyance roller 55a is in phase with the cyclic fluctuation of the second drive conveyance roller 56a when the leading end of the sheet P reaches the second conveyance roller pair 56. This is because the sheet P may be greatly bent or excessively stretched between the first conveyance roller pair 55 and the second conveyance roller pair 56 if the speed difference between the fluctuation of the conveyance speed with the rotation cycle of the first drive conveyance roller 55a and the fluctuation of the conveyance speed with the rotation cycle of the second drive conveyance roller 56a is large when the sheet P is conveyed by both the first conveyance roller pair 55 and the second conveyance roller pair 56. Therefore, the output image may not be read accurately.

In the present embodiment, as described above, the output image on the sheet P read by the reader 51 is compared with the master image that is the original data of the output image, thereby inspecting the output image and correcting the graduation reproduction curve of the image processing parameter. Accordingly, if the sheet P is greatly bent or excessively stretched between the first conveyance roller pair 55 and the second conveyance roller pair 56 and the reading accuracy deteriorates, the inspection of the output image or the correction of the graduation reproduction curve of the image processing parameter may not be performed with high accuracy.

In the present embodiment, the fluctuation of the conveyance speed with the rotation cycle of the first drive conveyance roller 55a is in phase with the fluctuation of the conveyance speed with the rotation cycle of the second drive conveyance roller 56a when the leading end of the sheet P reaches the second conveyance roller pair 56. Accordingly, when the sheet P is conveyed by the first conveyance roller pair 55 and the second conveyance roller pair 56, the difference between the conveyance speed by the first drive conveyance roller 55a and the conveyance speed by the second drive conveyance roller 56a can be reduced. Therefore, the sheet P is not greatly bent or excessively stretched between the first conveyance roller pair 55 and the second conveyance roller pair 56, thereby preventing the reading accuracy from deteriorating. As a result, the inspection of the output image and the correction of the graduation reproduction curve of the image processing parameter can be performed with high accuracy.

Further, preferably, the distance X1 from the first conveyance roller pair 55 to the image reading position E is an integral multiple of the circumference of the first drive conveyance roller 55a (i.e., $X1=na \times \pi \times D1a$, where na is an integer), and the distance X2 from the image reading position E to the second conveyance roller pair 56 is an integral multiple of the circumference of the first drive conveyance roller 55a (i.e., $X2=nb \times \pi \times D1a$, where nb is an integer), resulting in the distance from the first conveyance roller pair 55 to the second conveyance roller pair 56 (i.e., X1+X2) being an integral multiple of the circumference of the first drive conveyance roller 55a.

By setting the distance from the first conveyance roller pair 55 to the second conveyance roller pair 56 to an integral multiple of the circumference of the first drive conveyance roller 55a, the cyclic fluctuation of the first drive conveyance roller 55a can be easily in phase with the cyclic fluctuation of the second drive conveyance roller 56a when the leading end of the sheet P reaches the second conveyance roller pair 56. That is, the image reading device 50 is assembled so that the cyclic fluctuation of the first drive conveyance roller 55a is in phase with the cyclic fluctuation of the second drive conveyance roller 56a. After that, by just matching the drive start and drive stop timing between of the first drive conveyance roller 55a and the second drive conveyance roller 56a, the cyclic fluctuation of the first drive conveyance roller 55a can be in phase with the cyclic fluctuation of the second drive conveyance roller 56a when the leading end of the sheet P reaches the second conveyance roller pair 56.

Further, by setting the distance X1 from the first conveyance roller pair 55 to the image reading position E to an integral multiple of the circumference of the first drive conveyance roller 55a (i.e., $X1=na \times \pi \times D1a$, where na is an integer), the timing at which the leading end of the sheet P passes through the image reading position E can be stabilized, and the reading accuracy can be stabilized.

Figure 8:
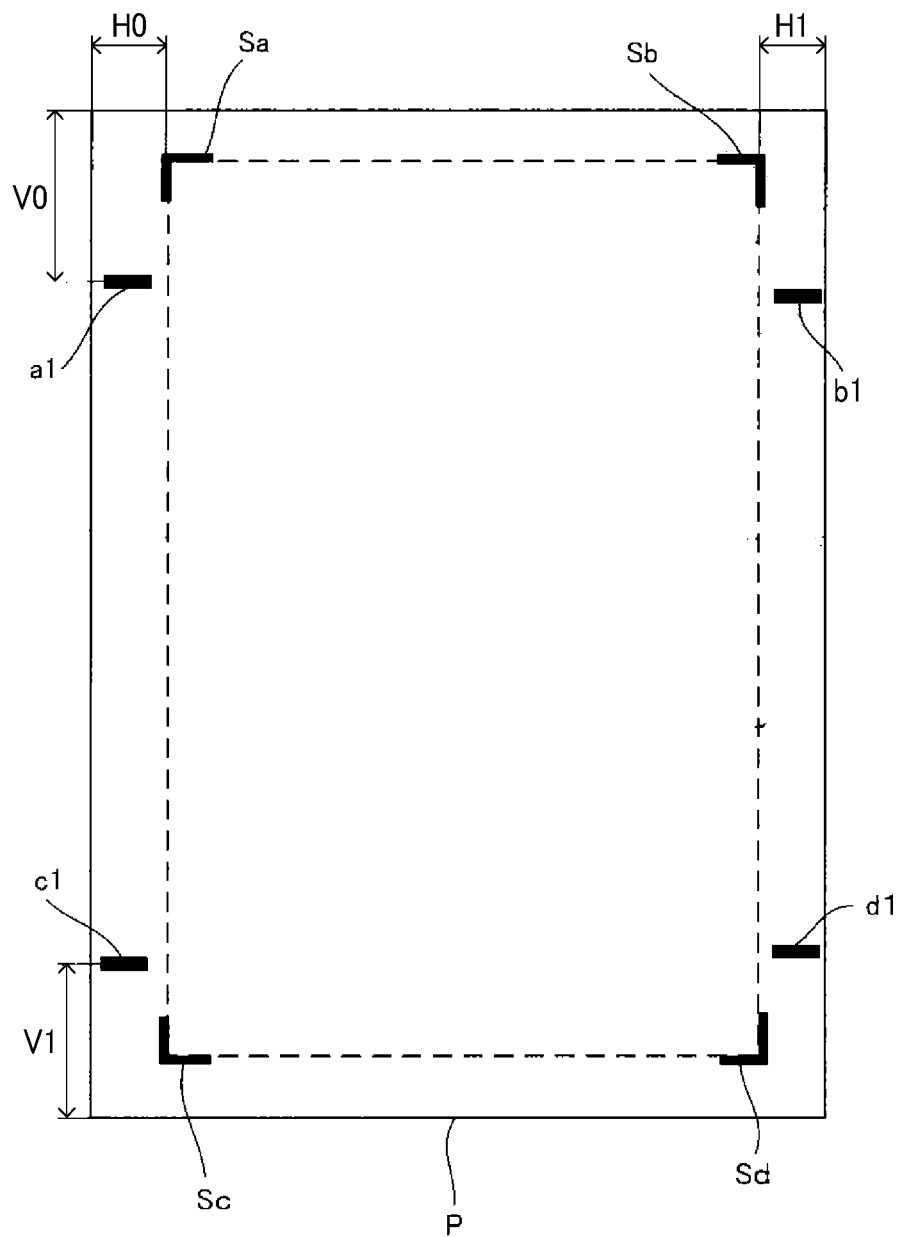
FIG. 8 is a schematic view illustrating another example of the detection pattern in which detection marks are formed outside an output image area according to an embodiment of the present disclosure.

FIG. 8 is a schematic view illustrating an example of the detection pattern in which detection marks are formed outside an output image area of the sheet P. In FIG. 8, cutting marks Sa to Sd are reference marks for cutting the sheet P after the image formation, and the inside enclosed by the broken line connecting between the cutting marks Sa to Sd is the output image area.

Generally, the cutting marks Sa to Sd also serves as the detection marks for adjusting the image position. The distance from the cutting marks Sa and Sb on the front side to the leading end of the sheet P and the distance from the cutting marks Sc and Sd on the rear side to the trailing end of the sheet P are short. There is a limit to reducing the diameters of the first drive conveyance roller 55a and the second drive conveyance roller 56a due to the effect of the conveyance force on the sheet P. Therefore, when the cutting marks Sa to Sd are used as the detection marks for adjusting the image position, the distance from the leading end of the sheet P to the front detection marks is too short to be an integral multiple of the circumference of the first drive conveyance roller 55a. Therefore, as illustrated in FIG. 8, front detection marks a1 and b 1 are provided outside the output image area. As a result, the distance from the leading end of the sheet P to the front detection marks a1 and b 1 can be an integral multiple of the circumference of the first drive conveyance roller 55a.

Further, by providing rear detection marks c1 and d1 outside the output image area, the rear detection marks c1 and d1 can be located at the positions away from the trailing end of the sheet P by an integral multiple of the circumference of the second drive conveyance roller 56a.

In FIG. 8, the position in width direction of the sheet P is detected at the vertical bar portions of the cutting marks Sa to Sd extending in the conveyance direction. Alternatively, detection marks for detecting the position in the width direction of the sheet P may also be provided outside the output image area.

Figure 9:
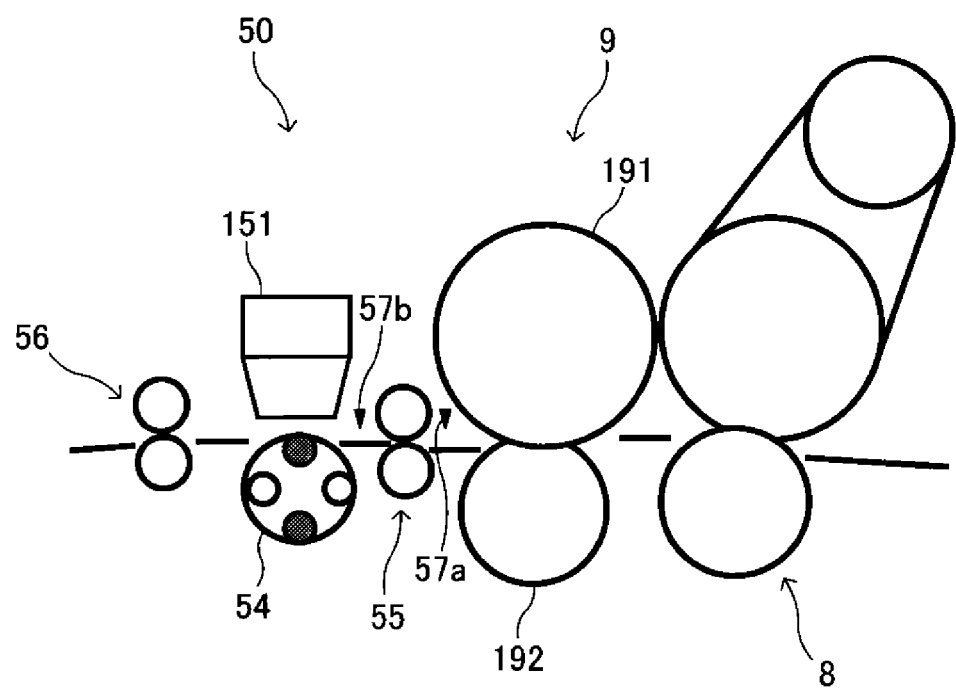
FIG. 9 is a schematic view illustrating a configuration of a sheet conveyor including a fixing device, a cooling device, and an image reading device according to a variation.

FIG. 9 is a schematic view illustrating a variation of the sheet conveyor including the fixing device 8, the cooling device 9, and the image reading device 50. In the sheet conveyor according to the variation, the cooling device 9 includes, for example, a cooling roller 191 including a heat pipe and a pressure roller 192 that presses the sheet P against the cooling roller 191. Further, in the sheet conveyor according to the variation, the image reading device 50 includes an image reading unit that are an equal magnification optical system such as a contact image sensor (CIS) 151. Other configurations are the same as in the above-described embodiment. Thus, the sheet conveyor according to the variation can be downsized as compared with the sheet conveyor including the image reading unit that are a reduced optical system such a charge-coupled device (CCD) as illustrated in FIG. 2.

In the present embodiment, as expressed by Expressions 2 and 3, the distances V0 and V1 are just an integral multiple of the circumference of the respective rollers (i.e., the first and second drive conveyance roller 55a and 56a). Such a configuration is most preferable. However, in consideration of the manufacturing tolerances of the respective rollers, the distances V0 and V1 allow ±5% error of the length obtained by an integral multiple of the circumference of the respective rollers. For example, an integer n1 can be replaced with an integer n1' in Expression 2, where $0.95 \times n1 \leq n1' \leq 1.05 \times n1$. The same applies to an integer n2 in Expression 3. In addition, the same applies to integers na and nb described above. The value of "an integral multiple" in the present embodiment is not limited to only just the value of an integral multiple and is defined so as to allow ±5% error of the value of an integral multiple.

The above descriptions concern about the electrophotographic image forming apparatus 300, but the present disclosure can be applied to an inkjet image forming apparatus. Further, in the above embodiments, the image reading device 50 is arranged in the image forming apparatus 300, but the image reading device 50 may be coupled to the image forming apparatus 300 and the sheet P may be conveyed from the image forming apparatus 300 to the image reading device 50.

Further, the present disclosure is applicable to an apparatus including an image reading unit. The sheet P on which the detection marks a to d are formed is ejected from the image forming apparatus and set on an automatic document feeder (ADF). The ADF conveys the sheet P on which the detection marks a to d are formed, and the image reading unit reads the detection marks a to d on the sheet P.

The embodiments described above are examples and can provide, for example, the following effects, respectively.

Aspect 1

A conveyance device includes a conveyance roller pair such as the first conveyance roller pair 55 to convey a recording medium to an image reading position E of an image reading unit. The conveyance roller pair includes a drive roller such as the first drive conveyance roller 55a and a driven roller such as the first driven conveyance roller 55b. The driven roller contacts the drive roller and rotates following the drive roller. The drive roller has a diameter satisfying a relation in which a detection mark on the recording medium is on a position away from a leading end of the recording medium by an integral multiple of a circumference of the drive roller in a conveyance direction of the recording medium.

The conveyance speed of the recording medium conveyed to the image reading position E fluctuates with the rotation cycle of the drive roller (first drive roller) due to the eccentricity of the drive roller of the conveyance roller pair (first conveyance roller pair). As the conveyance speed of the recording medium thus fluctuates with the rotation cycle of the drive roller, the scanned image expands and contracts with the rotation cycle of the drive roller. When the scanned image expands and contracts, the actual position of the detection mark on the sheet P in the conveyance direction (i.e., the distance from the leading end of the recording medium to the detection mark) may deviate from the position of the detection mark of the scanned image in the conveyance direction. As a result, the image correction may not be performed with high accuracy based on the scanned image.

Therefore, in Aspect 1, the drive roller has the diameter so that the detection mark is on the position away from the leading end of the recording medium by an integral multiple of the circumference of the drive roller in the conveyance direction of the recording medium. When the scanned image expands and contracts with the rotation cycle of the drive roller, the positional deviation between the actual position of the detection mark on the recording medium and the position of the detection mark of the scanned image in the conveyance direction becomes 0 at the position away from the leading end of recording medium by an integral multiple of the circumference of the drive roller. Further, as illustrated in FIG. 7, the positional deviation from the actual position in the conveyance direction is small in the vicinity of the position away from the leading end of the recording medium by an integral multiple of the circumference of the drive roller. Therefore, in Aspect 1, since the drive roller has the diameter so that the detection mark is on the position away from the leading end of the recording medium by an integral multiple of the circumference of the drive roller in the conveyance direction of the recording medium, the image correction such as the registration correction of the image formed on the recording medium and the skew correction of the image can be performed with high accuracy based on the position of the detection mark of the scanned image.

Aspect 2

In Aspect 1, a diameter of the driven roller such as the first driven conveyance roller 55b is an integral multiple of the diameter of the drive roller such as the first drive conveyance roller 55a.

With this configuration, as described in the above embodiments, the detection mark is on the position away from the leading end of the recording medium such as the sheet P by an integral multiple of the circumference of the driven roller such as the first driven conveyance roller 55b in the conveyance direction of the recording medium. As a result, even if the conveyance speed of the recording medium fluctuates with the rotation cycle of the driven roller, the positional deviation between the position of the detection mark of the scanned image and the actual position of the detection mark on the recording medium can be reduced.

Aspect 3

In Aspect 1 or 2, the detection mark is a front detection mark such as the front detection marks a and b on a front side of the recording medium such as the sheet P.

With this configuration, as described in the above embodiments, the difference between the distance from the leading end of the recording medium to the front detection mark of the scanned image and the actual distance from the leading end of the recording medium to the front detection mark on the recording medium can be reduced.

Aspect 4

In Aspect 3, the conveyance device further includes another conveyance roller pair such as the second conveyance roller pair 56 to convey the recording medium passing through the image reading position E. Said another conveyance roller pair includes another drive roller such as the second drive conveyance roller 56a and another driven roller such as the second driven conveyance roller 56b. Said another driven roller contacts said another drive roller and rotates following said another drive roller. Said another drive roller has a diameter satisfying a relation in which a rear detection mark on a rear side of the recording medium is on a position away from a trailing end of the recording medium by an integral multiple of a circumference of said another drive roller in the conveyance direction of the recording medium.

With this configuration, as described in the above embodiments, when the rear detection mark such as the rear detection marks c and d passes through the image reading position E, the trailing end of the recording medium such as the sheet P has passed through the first conveyance roller pair such as the first conveyance roller pair 55, and the recording medium is conveyed by said another conveyance roller pair such as the second conveyance roller pair 56. Therefore, the conveyance speed of the recording medium fluctuates with the rotation cycle of said another drive roller (second drive roller) such as the second drive conveyance roller 56a. As a result, the portion of the scanned image from the rear detection mark to the trailing end of the recording medium expands and contracts with the rotation cycle of the second drive roller, and the distance from the rear detection mark of the scanned image to the trailing end of the recording medium may differ from the actual distance from the rear detection mark on the recording medium to the trailing end of the recording medium.

Therefore, in Aspect 4, the second drive roller has the diameter so that the rear detection mark on the rear side of the recording medium is on the position away from the trailing end of the recording medium by an integral multiple of the circumference of the second drive roller in the conveyance direction of the recording medium. When the scanned image expands and contracts with the rotation cycle of the second drive roller, the difference between the actual distance from the rear detection mark on the recording medium to the trailing end of the recording medium and the distance from the rear detection mark of the scanned image to the trailing end of the recording medium becomes 0 at the position away from the trailing end of the recording medium by an integral multiple of the circumference of the second drive roller. When the rear detection mark is located in the vicinity of the position away from the trailing end of the recording medium by an integral multiple of the circumference of the second drive roller, the difference between the actual distance from the rear detection mark on the recording medium to the trailing end of the recording medium and the distance from the rear detection mark of the scanned image to the trailing end of the recording medium is small. Therefore, since the second drive roller has the diameter so that the rear detection mark on the recording medium is on the position away from the trailing end of the recording medium by an integral multiple of the circumference of the second drive roller in the conveyance direction of the recording medium, the image correction such as the magnification correction of the image formed on the recording medium can be performed with high accuracy based on the position of the detection mark of the scanned image.

Aspect 5

In Aspect 4, a diameter of said another driven roller such as the second driven conveyance roller 56b is an integral multiple of the diameter of said another drive roller.

With this configuration, as described in the above embodiments, the rear detection mark on the rear side of the recording medium is on the position away from the trailing end of the recording medium such as the sheet P by an integral multiple of the circumference of the second driven roller such as the second driven conveyance roller 56b in the conveyance direction of the recording medium. As a result, even if the conveyance speed of the recording medium fluctuates with the rotation cycle of the second driven roller, the difference between the actual distance from the rear detection mark on the recording medium to the trailing end of the recording medium and the distance from the rear detection mark of the scanned image to the trailing end of the recording medium can be further reduced.

Aspect 6

In any one of Aspects 1 to 5, the driven roller such as the first driven conveyance roller 55b is configured to measure a length of the recording medium in the conveyance direction with a measuring instrument such as the rotary encoder 59.

With this configuration, as described in the above embodiments, the length of the recording medium can be measured even if the conveyance speed of the recording medium fluctuates.

Aspect 7

In any one of Aspects 1 to 6, a distance from the conveyance roller pair such as the first conveyance roller pair 55 to the image reading position E is an integral multiple of the circumference of the drive roller such as the first drive conveyance roller 55a.

With this configuration, as described in the above embodiments, the leading end of the recording medium passes through the image reading position E at a predetermined timing, thereby stabilizing the reading accuracy.

Aspect 8

In any one of Aspects 1 to 7, the conveyance device further includes another conveyance roller pair such as the second conveyance roller pair 56 to convey the recording medium passing through the image reading position E. Said another conveyance roller pair includes another drive roller such as the second drive conveyance roller 56a and another driven roller such as the second driven conveyance roller 56b. Said another driven roller contacts said another drive roller and rotates following said another drive roller. A fluctuation of a conveyance speed of the recording medium with a rotation cycle of the drive roller such as the first drive conveyance roller 55a is in phase with a fluctuation of a conveyance speed of the recording medium with a rotation cycle of said another drive roller.

With this configuration, as described in the above embodiments, when the recording medium such as the sheet P is conveyed by the first conveyance roller pair and the second conveyance roller pair, the speed difference can be reduced between the fluctuation of the conveyance speed with the rotation cycle of the first drive roller and the fluctuation of the conveyance speed with the rotation cycle of the second drive roller. As a result, the sheet P is not bent or stretched between the first conveyance roller pair and the second conveyance roller pair, thereby reading an image on the recording medium with high accuracy.

Aspect 9

In Aspect 8, a distance from the conveyance roller pair such as the first conveyance roller pair 55 to said another conveyance roller pair such as the second conveyance roller pair 56 is an integral multiple of the circumference of the drive roller.

As described in the above embodiments, the image reading device is assembled so that the cyclic fluctuation of the first drive roller such as the first drive conveyance roller 55a is in phase with the cyclic fluctuation of the second drive roller such as the second drive conveyance roller 56a. After that, by matching the drive start and drive stop timing between of the first drive roller and the second drive roller, the fluctuation of the conveyance speed of the recording medium with the rotation cycle of the first drive roller can be in phase with the fluctuation of the conveyance speed of the recording medium with the rotation cycle of the second drive roller.

Aspect 10

A conveyance device includes a conveyance roller pair such as the second conveyance roller pair 56 to convey a recording medium passing through an image reading position E of an image reading unit. The conveyance roller pair includes a drive roller such as the second drive conveyance roller 56a and a driven roller such as the second driven conveyance roller 56b. The driven roller contacts the drive roller and rotates following the drive roller. The drive roller has a diameter satisfying a relation in which a rear detection mark on a rear side of the recording medium is on a position away from a trailing end of the recording medium by an integral multiple of a circumference of the drive roller in a conveyance direction of the recording medium.

With this configuration, as described in the above embodiments, when the rear detection mark such as the rear detection marks c and d passes through the image reading position E, the trailing end of the recording medium such as the sheet P has passed through the first conveyance roller pair such as the first conveyance roller pair 55, and the recording medium is conveyed by the second conveyance roller pair such as the second conveyance roller pair 56. Therefore, the conveyance speed of the recording medium fluctuates with the rotation cycle of the second drive roller such as the second drive conveyance roller 56a. As a result, the portion of the scanned image from the rear detection mark to the trailing end of the recording medium expands and contracts with the rotation cycle of the second drive roller, and the distance from the rear detection mark of the scanned image to the trailing end of the recording medium may differ from the actual distance from the rear detection mark on the recording medium to the trailing end of the recording medium.

Therefore, in Aspect 10, the second drive roller has the diameter so that the rear detection mark on the rear side of the recording medium is on the position away from the trailing end of the recording medium by an integral multiple of the circumference of the second drive roller in the conveyance direction of the recording medium. When the scanned image expands and contracts with the rotation cycle of the second drive roller, the difference between the actual distance from the rear detection mark on the recording medium to the trailing end of the recording medium and the distance from the rear detection mark of the scanned image to the trailing end of the recording medium becomes 0 at the position away from the trailing end of the recording medium by an integral multiple of the circumference of the second drive roller. When the rear detection mark is located in the vicinity of the position away from the trailing end of the recording medium by an integral multiple of the circumference of the second drive roller, the difference is small between the actual distance from the rear detection mark on the recording medium to the trailing end of the recording medium and the distance from the rear detection mark of the scanned image to the trailing end of the recording medium. Therefore, the second drive roller has the diameter so that the rear detection mark on the rear side of the recording medium is on the position away from the trailing end of the recording medium by an integral multiple of the circumference of the second drive roller in the conveyance direction of the recording medium. Accordingly, the image correction such as the magnification correction of the image formed on the recording medium can be performed with high accuracy based on the position of the detection mark of the scanned image.

Aspect 11

An image reading device includes an image reading unit to read an image on a recording medium and the conveyance device according to any one of Aspects 1 to 10.

Aspect 12

In Aspect 11, the image reading unit includes one of an equal magnification optical system such as the CIS and a reduced optical system such as the CCD.

Aspect 13 An image forming apparatus includes an image forming device to form an image on a recording medium, an image reading unit to read the image on the recording medium, and the conveyance device according to any one of Aspects 1 to 10.

With this configuration, the image correction such as the registration correction of the image can be performed with high accuracy based on the scanned image.

Aspect 14

An image forming apparatus includes an image forming device to form an image on a recording medium such as the sheet P, an image reading unit to read the image on the recording medium, and a conveyance device to convey the recording medium. The conveyance device includes a conveyance roller pair such as the first conveyance roller pair 55 to convey the recording medium to an image reading position E of the image reading unit. The conveyance roller pair includes a drive roller such as the first drive conveyance roller 55a and a driven roller such as the first driven conveyance roller 55b. The driven roller contacts the drive roller and rotates following the drive roller. The image forming device forms a detection mark on the recording medium, and the detection mark is on a position away from a leading end of the recording medium by an integral multiple of a circumference of the drive roller in a conveyance direction of the recording medium.

With this configuration, similarly to Aspect 1, the distance from the leading end of the recording medium to the detection mark of the scanned image read by the image reading unit can substantially coincide with the actual distance from the leading end of the recording medium to the detection mark on the recording medium. With this configuration, the image correction such as the registration correction and the skew correction of the image formed on the recording medium can be performed with high accuracy.

Aspect 15

In Aspect 14, the detection mark is a front detection mark on a front side of the recording medium.

With this configuration, similarly to Aspect 3, the difference between the distance from the leading end of the recording medium to the front detection mark of the scanned image and the actual distance from the leading end of the recording medium to the front detection mark on the recording medium can be reduced.

Aspect 16

In Aspect 15, the image forming apparatus further includes another conveyance roller pair such as the second conveyance roller pair 56 to convey the recording medium passing through the image reading position E. Said another conveyance roller pair includes another drive roller such as the second drive conveyance roller 56a and another driven roller such as the second driven conveyance roller 56b. Said another driven roller contacts said another drive roller and rotates following said another drive roller. The image forming device forms a rear detection mark on a rear side of the recording medium, and the rear detection mark is on a position away from a trailing end of the recording medium by an integral multiple of a circumference of said another drive roller in the conveyance direction of the recording medium.

With this configuration, similarly to Aspect 4, the distance from the rear detection mark such as the detection marks c and d of the scanned image read by the image reading unit to the trailing end of the recording medium can substantially coincide with the actual distance from the detection mark on the recording medium to the trailing end of the recording medium. As a result, the position of the rear end of the image formed on the recording medium can be detected with high accuracy, and the image correction such as the magnification correction and the registration correction can be performed with high accuracy.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. A conveyance device comprising:
a conveyance roller pair configured to convey a recording medium to an image reading position of an image reading unit, the conveyance roller pair including:
a drive roller; and
a driven roller configured to contact the drive roller and rotate following the drive roller,
the drive roller having a diameter satisfying a relation in which a detection mark on the recording medium is on a position away from a leading end of the recording medium by an integer multiple of a circumference of the drive roller in a conveyance direction of the recording medium.

2. The conveyance device according to claim 1, wherein a diameter of the driven roller is an integer multiple of the diameter of the drive roller.

3. The conveyance device according to claim 1, wherein the detection mark is a front detection mark on a front side of the recording medium.

4. The conveyance device according to claim 3, further comprising another conveyance roller pair configured to convey the recording medium passing through the image reading position, said another conveyance roller pair including:
another drive roller; and
another driven roller configured to contact said another drive roller and rotate following said another drive roller,
wherein said another drive roller has a diameter satisfying a relation in which a rear detection mark on a rear side of the recording medium is on a position away from a trailing end of the recording medium by an integer multiple of a circumference of said another drive roller in the conveyance direction of the recording medium.

5. The conveyance device according to claim 4, wherein a diameter of said another driven roller is an integer multiple of the diameter of said another drive roller.

6. The conveyance device according to claim 1, wherein the driven roller is configured to measure a length of the recording medium in the conveyance direction.

7. The conveyance device according to claim 1, wherein a distance from the conveyance roller pair to the image reading position is an integer multiple of the circumference of the drive roller.

8. The conveyance device according to claim 1, further comprising another conveyance roller pair configured to convey the recording medium passing through the image reading position, said another conveyance roller pair including:
another drive roller; and
another driven roller configured to contact said another drive roller and rotate following said another drive roller,
wherein said another drive roller has a diameter same as the diameter of the drive roller, and
wherein a fluctuation of a conveyance speed of the recording medium with a rotation cycle of the drive roller is in phase with a fluctuation of a conveyance speed of the recording medium with a rotation cycle of said another drive roller.

9. The conveyance device according to claim 8, wherein a distance from the conveyance roller pair to said another conveyance roller pair is an integer multiple of the circumference of the drive roller.

10. An image reading device comprising:
an image reading unit configured to read an image on a recording medium; and
the conveyance device according to claim 1.

11. The image reading device according to claim 10, wherein the image reading unit includes one of an equal magnification optical system and a reduced optical system.

12. An image forming apparatus comprising:
an image forming device configured to form an image on a recording medium;
an image reading unit configured to read the image on the recording medium; and
the conveyance device according to claim 1.

13. A conveyance device comprising:
a conveyance roller pair configured to convey a recording medium passing through an image reading position of an image reading unit, the conveyance roller pair including:
a drive roller; and
a driven roller configured to contact the drive roller and rotate following the drive roller, the drive roller having a diameter satisfying a relation in which a rear detection mark on a rear side of the recording medium is on a position away from a trailing end of the recording medium by an integer multiple of a circumference of the drive roller in a conveyance direction of the recording medium.

14. An image forming apparatus comprising:
an image forming device configured to form an image on a recording medium;
an image reading unit configured to read the image on the recording medium; and
a conveyance device including a conveyance roller pair configured to convey the recording medium to an image reading position of the image reading unit, the conveyance roller pair including:
a drive roller; and
a driven roller configured to contact the drive roller and rotate following the drive roller,
the image forming device configured to form a detection mark on the recording medium, the detection mark on a position away from a leading end of the recording medium by an integer multiple of a circumference of the drive roller in a conveyance direction of the recording medium.

15. The image forming apparatus according to claim 14, wherein the detection mark is a front detection mark on a front side of the recording medium.

16. The image forming apparatus according to claim 15, further comprising another conveyance roller pair configured to convey the recording medium passing through the image reading position, said another conveyance roller pair including:
another drive roller; and
another driven roller configured to contact said another drive roller and rotate following said another drive roller,
wherein the image forming device is configured to form a rear detection mark on a rear side of the recording medium, and
wherein the rear detection mark is on a position away from a trailing end of the recording medium by an integer multiple of a circumference of said another drive roller in the conveyance direction of the recording medium.

* * * * *